United States Patent Office

2,996,434
Patented Aug. 15, 1961

2,996,434
BIOCHEMICAL PROCESS FOR THE PREPARATION OF l-CYSTEINE, l-CYSTINE, AND l-CYSTEIC ACID, MARKED BY SULPHUR AND BY α-HYDROGEN
François Chapeville, Paris, and Pierre Fromageot, Le Chesnay, France, assignors to Commissariat à l'Energie Atomique, Paris, France
No Drawing. Filed Feb. 1, 1960, Ser. No. 5,611
Claims priority, application France Feb. 3, 1959
24 Claims. (Cl. 195—68)

Certain amino acids, such as cysteine, cystine and cysteic acid, which are important constituents of living matter, are the subject of metabolic studies of scientific or medical interest.

Since living organisms utilize the laevo isomers of optically-active natural substances in a preferential manner, it is extremely important, for the interpretation of metabolic studies in which cysteine, cystine and cysteic acid are involved, to obtain such substances in the l-form.

The usual techniques for the marking of these products proceed essentially by chemical synthesis.

The disadvantages of such techniques are as follows:

(1) In relation to marking by the isotopes of sulphur, cysteine, cystine and cysteic acid are obtained in the racemic ld-form.

(2) In relation to marking by the isotopes of hydrogen, their fixation at a definite point in the molecule, either in the l-form or in the d-form, is particularly difficult; marking of the hydrogen in the α position, i.e. of the hydrogen attached to the carbon next to that of the acid function, is possible by chemical means, but the process is complex.

The biochemical synthesis of l-cysteine or of l-cystine is effected using the mineral forms of sulphur by various organisms, such as certain yeasts and bacteria and by green plants. The disadvantage of this kind of procedure lies in the small quantities of l-cysteine or l-cystine present in the living organisms, which renders very complex the extraction of these sulphur-containing amino acids in a pure form.

It is known that there are ways for resolving racemic (dl) cysteine or cystine by physical means, such as the fractional crystallization of certain salts or their counter-current distribution in immiscible solvent, or by biological means; the latter consists in the selective utilization of one of the optical isomers by biological systems.

Resolution requires laborious techniques and, at present, none has been applied to the isolation of a given, marked isomer of cysteine or cystine.

The object of the present invention is to provide a biochemical process for the preparation of l-cysteine, l-cystine or l-cysteic acid marked by sulphur and/or by α-hydrogen.

This process is essentially characterized in that pure l-cysteine is reacted with one or more reactants marked by sulphur or by hydrogen, the marking taking place between pH 5 and 11 and between the temperatures of 0° C. and 55° C., under the action of a biochemical catalyst constituted by the vitellin-vitellus sac of eggs of birds or reptiles in embryo or by an enzyme extracted therefrom by known methods of extraction and purification of enzymes, the reactants being employed according to the following rules taken separately or in combination:

(1) The reactant utilized is constituted by hydrogen sulphide or a sulphide marked by sulphur, when preparing cysteine or cystine marked by sulphur.

(2) The reactant utilized is constituted by a sulphite marked by sulphur, when preparing cysteic acid marked by sulphur.

(3) The reactant utilized is constituted by water marked by hydrogen, in the presence of hydrogen sulphide or a sulphide, when preparing cysteine or cystine marked by α-hydrogen.

(4) The reactant utilized is constituted by water marked by hydrogen, in the presence of sulphite, when preparing cysteic acid marked by α-hydrogen.

The fundamental reactions of this procedure are as follows:

(1)
$$SH-CH_2-CH(NH_2)-COOH + H_2S^* \rightleftharpoons H_2S + {}^*SH-CH_2-CH(NH_2)-COOH$$

(2)
$$SH-CH_2-CH(NH_2)-COOH + {}^*SO_3H^- \rightarrow SH_2 + {}^*-SO_3-CH_2-CH(NH_2)-COOH$$

(3)
$$SH-CH_2-CH(NH_2)-COOH + H_2S + {}^*H_2O \rightleftharpoons$$
$$H_2S + SH-CH_2-CH^*(NH_2)-COOH + H_2O$$

(4)
$$SH-CH_2-CH(NH_2)-COOH + SO_3H^- + {}^*H_2O \longrightarrow$$
$$H_2S + {}^-SO_3-CH_2-CH^*(NH_2)-COOH + H_2O$$

All these reactions take place under the action of an enzyme contained in the vitellin-vitellus sac of the eggs of birds and reptiles and the molecules of cysteine involved in the reaction and shown as the first reactant in Reactions 1–4 above are molecules of l-cysteine.

Reactions 1 and 3 lead to marked l-cysteine; they are in equilibrium.

Reactions 2 and 4 lead to marked l-cysteic acid and are not in equilibrium.

Conversion of marked l-cysteine into marked l-cystine is effected by oxidation, according to known chemical methods; the reverse conversion is effected by reduction.

The marked reactant used for Reaction 1 is hydrogen sulphide marked by sulphur; this can be replaced by a sulphide marked by sulphur; the isotopes of sulphur used are, for example $S^{35}$ or $S^{34}$.

The marked reactant used for Reaction 2 is a sulphite marked by sulphur and represented in the reaction equation by the anion $SO_3H^-$; $S^{35}$ or $S^{34}$ can be employed, for example.

The marked reactant used for Reaction 3 is water marked by hydrogen; deuterium, $H^2$, or tritium, $H^3$, can be used; it is necessary for Reaction 3 to be possible for hydrogen sulphide or a sulphide to be present; this is regenerated at the end of the reaction; the marking of cysteine according to Reaction 3 occurs solely at the hydrogen in the α position to the carbon of the acidic group.

It appears that an intermediate stage common to Reactions 1 and 3 is as follows:

(5)
$$HS-CH_2-CH(NH_2)-COOH \rightleftharpoons H_2S + CH_2=C(NH_2)-COOH$$

such that the molecule $$CH_2=C(NH_2)-COOH$$

produced by the reaction according to the equilibrium state (5) reacts with the marked hydrogen sulphide to give cysteine marked by sulphur according to Reaction 6:

(6)
$$CH_2=C(NH_2)-COOH + H_2S^* \rightleftharpoons {}^*SH-CH_2-CH(NH_2)-COOH$$

the chemical equilibrium characterizing this reaction being the same as that of Reaction 5. The molecule produced in Reaction 5 also reacts with the marked water to give marked cysteine marked by the α-hydrogen according to overall Reaction 7:

(7)
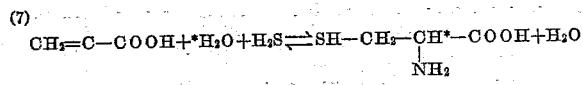

the SH group of the H₂S and the *H of the water becoming attached to the double bond.

It is to be noted that losses are caused through a degradation of the type:

(8)     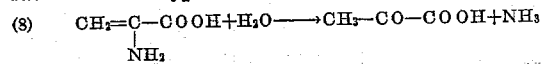

leading to the formation of pyruvic acid; this degradation reaction is predominant in conditions other than those of the invention.

Reactions 1 and 3 take place at a pH range of 5 to 11, preferably selected between 9 and 9.5; the temperature range at which these reactions occur extends from 0° to 55° C., this range being limited at higher temperature by the destruction of the enzyme around 55° C.

Reactions 2 and 4 lead to *l*-cysteic acid marked by sulphur or by α-hydrogen, starting from *l*-cysteine.

The reactant utilized for Reaction 4 is water marked by hydrogen; deuterium, H², or tritium, H³, can be used; it is necessary for this reaction to be possible for a sulphite to be present; cysteic acid obtained by Reaction 4 is marked solely at the hydrogen in α position to the carbon of the acid group.

It appears that an intermediate stage common to Reactions 2 and 4 is similar to Reaction 5:

(5)     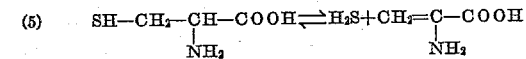

such that there then follows:

(a) In the presence of *SO₃H⁻ alone, the following reaction:

(9)     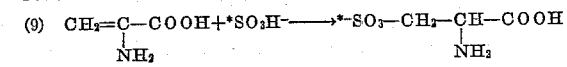

Reaction 2 then appearing as the sum of Reactions 5 and 9.

(b) In the presence of SO₃H⁻ and *H₂O:

(10)
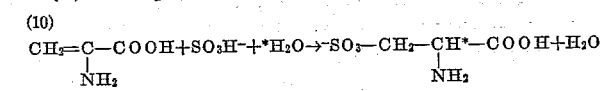

Reaction 4 then appearing as the sum of Reactions 5 and 10.

Reactions 2 and 4 occur under the same conditions of pH and temperature as Reactions 1 and 3; the pH is preferably between 8 and 8.5 in the case of Reactions 2 and 4.

It will also be noted that it is possible, according to the process of the invention, to obtain *l*-cysteine, *l*-cystine and *l*-cysteic acid, marked both by sulphur and by α-hydrogen, provided the molecules of H₂S and SO₃H⁻ represented as the first reactant of Equations 3 and 4 are marked by sulphur.

The enzyme under the action of which Reactions 1 to 4 take place can be utilized in a purified form prepared from the vitellin-vitellus sac ensemble, as explained below; it can be used in admixture with other constituents of this ensemble homogenized in the reactants.

The catalytic action of the enzyme operates in an aqueous solution of the reactions, in the temperature and pH ranges mentioned above.

A purified enzymatic system can be prepared by proceeding as follows:

The vitellin-vitellus sac ensemble (yolk and its envelope) of chicken eggs preferably eighteen days old are separated; a litre of 0.9% NaCl solution is added to a kilo of this ensemble. The material is homogenized mechanically and a litre of pure ethyl ether is added.

This is agitated and allowed to stand for twelve hours at 0° C. The material is centrifuged for one hour at 0° C. The mixture separates into four phases: a clear, yellow, ethereal layer, a curdled layer at the ether-water interface, a red, aqueous layer and a sediment.

The red aqueous layer, which contains the enzyme to be extracted, is separated and the dissolved ether is removed by evaporation in vacuo. The aqueous phase obtained is added to ethanol cooled to −10° C., so as to obtain a final concentration of 20%. A precipitate forms. It is recovered and redissolved in 350 mls. 0.9% NaCl at 0° C. This solution, which contains the active enzyme, is purified by the addition of 107 grams of ammonium sulphate at 0° C., the precipitate which forms is recovered after twelve hours and dialyzed against five litres of 0.9% NaCl soltion at 0° C., in order to extract by means of this solution the sulphate retained by the precipitate.

The solution obtained inside the dialysis contains the active enzyme; it is then lyophilized. A yellowish powder remains, which corresponds to the purified enzyme; this powder remains indefinitely at −10° C.

Four non-limiting examples are described below of the application of the biochemical process to the preparation of *l*-cysteine, *l*-cystine and *l*-cysteic acid marked by sulphur and/or by α-hydrogen, according to the invention. The means described in connection with these examples may be considered as part of the invention, since all equivalent means can also be used without exceeding its scope.

*Example 1.—Preparation of l-cystine marked by sulphur*

150 ml. of a buffer solution of pH 9 containing 0.05 mole of trihydroxy-methylaminomethane, 2 millimoles of ordinary *l*-cysteine in the form of the hydrochloride, 2 millimoles of Na₂S* representing a total activity of 2 millicuries and 500 mg. the enzymatic preparation purified as indicated above, were introduced into a receptacle provided with a ground-glass stopper. The pH was adjusted to 9 by the addition of N/10 HCl or N/10 NaOH; the receptacle was closed and agitated at 38° C. for twenty-four hours.

5 ml. of concentrated hydrochloric acid were introduced into the receptacle and the excess hydrogen sulphide was removed, which can be recovered and used for a later experiment. The solution was filtered on a column of sulphonated resin in an H form. The resin was washed with water and contained *l*-cysteine marked by sulphur; this cysteine was eluted with 4 N HCl and a solution of cystine was recovered; the cystine was precipitated from its solution by taking it to the isoelectric point of the amino acid the cystine can also be precipitated as a copperish mercaptan or by any known procedure; 0.7 millimole of *l*-cystine marked by sulphur was obtained. The radioactivity of the product so obtained was equal to 0.4 millicurie per millimole.

The yield of marked *l*-cysteine is equal to 70% of the theoretical yield, about 30% of the *l*-cysteine being degraded or not being recoverable; 50% of the initial activity of the sodium sulphide, equal to one millicurie per millimole, can theoretically pass into the cysteine, giving the latter an activity of about 0.5 millicurie per millimole; the yield in activity expressed with respect to this theoretical activity is in fact equal to 80% the activity of the cysteine obtained having been measured as 0.4 millicurie per millimole.

*Example 2.—Preparation of l-cysteine marked by sulphur*

The same procedure is adopted as in Example 1; the *l*-cysteine obtained was then reduced to *l*-cystine by known reduction processes; 1.4 millimoles of *l*-cystine marked by sulphur were obtained.

Example 3.—Preparation of l-systeic acid marked by sulphur

The conditions of Example 1 were used, substituting *SO₃H⁻ for Na₂S* and operating at pH 8 instead of pH 9. The isotope of sulphur used was *S³⁵; the solution obtained by acid elution of the sulphonated ion exchange resin was then treated in order to precipitate cysteic acid.

The yield in activity expressed with respect to the activity theoretically possible was equal to 70–80%; since the reaction of formation was complete, all the activity of the initial sulphite was theoretically transferable to the cysteic acid.

Example 4.—Preparation of l-cystine marked by α-H l-Cystine marked with the isotopes of hydrogen was prepared by substituting for ordinary water a solution of water marked by hydrogen by means of tritium, *H³; the volume of the aqueous solution was divided by the factor ten with respect to that of the aqueous solution of Example 1, the quantities of the other reactants not being changed; if the sodium sulphide used is marked by sulphur, cystine marked simultaneously by α-hydrogen and by sulphur is obtained.

Example 5.—Preparation of l-cysteic acid marked by α-H l-Cysteic acid marked by α-hydrogen or simultaneously by α-hydrogen and by sulphur is obtained in an analogous manner, by substituting SO₃H⁻ for the Na₂S in the preceding example.

The isotopic enrichment of the α-hydrogen of the products obtained in Examples 4 and 5 was equal to 70–80% of that of the marked water.

In a general manner, the isotopic abundance of sulphur and the hydrogen of the water used in the process of the invention can be raised in order to permit the preparation of cystine, cysteine and cysteic acid marked with the desired activity.

What we claim is:

1. In a process for preparing one of the amino acids l-cysteine, l-cystine and l-cysteic acid labelled with an isotopic atom, the step of treating non-labelled l-cysteine with an aqueous solution of a compound selected from the group consisting of hydrogen sulfide, hydrogen oxide, soluble sulfides, sulfurous acid and soluble sulfites, which compound contains in its molecule at least one labelled atom selected from the group consisting of $H_2{}^*O$, $Z_aS_b{}^*$ and $Z_a(SO_3{}^*)_b$ where Z is a cation of a water soluble compound of the stated formula, $a$ and $b$ are the combining proportions of the formulas and * indicates a labelled isotopic atom, in the presence of an enzymatically active amount of the vitellin-vitellus sac of birds' eggs in embryo, the solution having a pH in the approximate range of 5 to 11 and a temperature in the approximate range of 0° C. to 55° C.

2. A process as described in claim 1 in which the enzymatically active amount of the vitellin-vitellus sac is an aqueous extract from a mixture of the sac with water and ethyl ether.

3. In a process for preparing l-cystine and l-cysteine both labelled with a sulfur isotope, the step of treating non-labelled l-cysteine with an aqueous solution containing hydrogen sulfide labelled with a sulfur isotope in the presence of an enzymatically active amount of the vitellin-vitellus sac of birds' eggs in embryo, the solution having a pH in the approximate range of 5 to 11 and a temperature of from approximately 0° C. to 55° C.

4. In a process for preparing l-cystine and l-cysteine both labeled with S³⁵, the step of treating non-labelled l-cysteine with an aqueous solution containing hydrogen sulfide labelled with S³⁵ in the presence of an enzymatically active amount of the vitellin-vitellus sac of birds' eggs in embryo, the solution having a pH of approximately 5 to 11 and a temperature of from approximately 0° C. to 55° C.

5. Process as described in claim 3, in which the pH of the solution is from 9 to 9.5 and the temperature is from 30° C. to 45° C.

6. Process as described in claim 4, in which the pH of the solution is from 9 to 9.5 and the temperature is from 30° C. to 45° C.

7. In a process for preparing l-cystine and l-cysteine both labelled with a sulfur isotope, the step of treating non-labelled l-cysteine with an aqueous solution containing sodium sulfide labelled with a sulfur isotope, in the presence of an enzymatically active amount of the vitellin-vitellus sac of birds' eggs in embryo, the solution having a pH of from 5 to 11 and a temperature from 0° C. to 55° C.

8. In a process for preparing l-cystine and l-cysteine both labelled with S³⁵, the step of treating non-labelled l-cysteine with an aqueous solution containing sodium sulfide labelled with S³⁵, in the presence of an enzymatically active amount of the vitellin-vitellus sac of birds' eggs in embryo, the solution having a pH of from 5 to 11 and a temperature from 0° C. to 55° C.

9. Process as described in claim 7, in which the pH of the solution is from 9 to 9.5 and the temperature is from 30° C. to 45° C.

10. Process as described in claim 8, in which the pH of the solution is from 9 to 9.5 and the temperature is from 30° C. to 45° C.

11. In a process for preparing l-cysteic acid labelled with a radioactive sulfur isotope, the step of treating non-labelled l-cysteine with an aqueous solution containing sulfurous ions labelled with a sulfur isotope, in the presence of an enzymatically active amount of the vitellin-vitellus sac of birds' eggs in embryo, the solution having a pH of from 5 to 11 and a temperature from 0° C. to 55° C.

12. In a process for preparing l-cysteic acid labelled with S³⁵, the step of treating non-labelled l-cysteine with an aqueous solution containing sulfurous ions labelled with S³⁵, in the presence of an enzymatically active amount of the vitellin-vitellus sac of birds' eggs in embryo, the solution having a pH from 5 to 11 and a temperature from 0° C. to 55° C.

13. Process as described in claim 11, in which the pH of the solution is from 8 to 8.5 and the temperature is from 30° C. to 45° C.

14. Process as described in claim 12 in which the pH of the solution is from 8 to 8.5 and the temperature is from 30° C. to 45° C.

15. In a process for preparing l-cystine and l-cysteine both labelled with a hydrogen isotope, the step of treating non-labelled l-cysteine with an aqueous solution containing hydrogen sulfide and water molecules labelled with a hydrogen isotope, in the presence of an enzymatically active amount of the vitellin-vitellus sac of birds' eggs in embryo, the solution having a pH from 5 to 11 and a temperature from 0° C. to 55° C.

16. In a process for preparing l-cystine and l-cysteine both labelled with tritium, the step of treating non-labelled l-cysteine with an aqueous solution containing hydrogen sulfide and tritium oxide, in the presence of an enzymatically active amount of the vitellin-vitellus sac of birds' eggs in embryo, the solution having a pH from 5 to 11 and a temperature from 0° C. to 55° C.

17. Process as described in claim 15, in which the pH of the solution is from 9 to 9.5 and the temperature is from 30° C. to 45° C.

18. Process as described in claim 16, in which the pH of the solution is from 9 to 9.5 and the temperature is from 30° C. to 45° C.

19. In a process for preparing l-cystine and l-cysteine both labelled with tritium, the step of treating non-labelled l-cysteine with an aqueous solution containing sodium sulfide and tritium oxide, in the presence of an enzymatically active amount of the vitellin-vitellus sac of birds' eggs in embryo, the solution having a pH from 5 to 11 and a temperature from 0° C. to 55° C.

20. Process as described in claim 19 in which the pH of the solution is from 9 to 9.5 and the temperature is from 30° C. to 45° C.

21. In a process for preparing l-cysteic acid labelled with a hydrogen isotope, the step of treating non-labelled l-cysteine with an aqueous solution containing sulfurous ions and water molecules labelled with a hydrogen isotope, in the presence of an enzymatically active amount of the vitellin-vitellus sac of birds' eggs in embryo, the solution having a pH of from 5 to 11 and a temperature from 0° C. to 55° C.

22. In a process for preparing l-cysteic acid labelled with tritium, the step of treating non-labelled l-cysteine with an aqueous solution containing sulfurous ions and tritium oxide, in the presence of an enzymatically active amount of the vietllin-vitellus sac of birds' eggs in embryo, the solution having a pH from 5 to 11 and a temperature from 0° C. to 55° C.

23. Process as described in claim 21 in which the pH of the solution is from 8 to 8.5 and the temperature is from 30° C. to 45° C.

24. Process as described in claim 22 in which the pH of the solution is from 8 to 8.5 and the temperature is from 30° C. to 45° C.

References Cited in the file of this patent

Biochemical Journal, vol. 52, article by Williams et al., pages 314 to 317, published 1952, Cambridge University Press, London.

Archives of Biochemistry and Biophysics, vol. 35, pages 140–145, 1952.

UNITED STATES PATENT OFFICE
CERTIFICATE OF CORRECTION

August 15, 1961

Patent No. 2,996,434

François Chapeville et al.

It is hereby certified that error appears in the above numbered patent requiring correction and that the said Letters Patent should read as corrected below.

Column 1, line 46, for "solvent" read -- solvents --; column 2, line 30, after "reptiles" insert a semicolon; column 4, line 16, for "soltion" read -- solution --; line 53, after "acid" insert a semicolon; column 5, line 1, for "l-systeic", in italics, read -- l-cysteic --, in italics; column 8, line 2, for "vietllin-vitellus" read -- vitellin-vitellus --.

Signed and sealed this 6th day of February 1962.

(SEAL)
Attest:

ERNEST W. SWIDER
Attesting Officer

DAVID L. LADD
Commissioner of Patents